April 16, 1929.   R. C. KRUEGER   1,709,080
CANDY DISPLAY DEVICE
Filed April 13, 1927
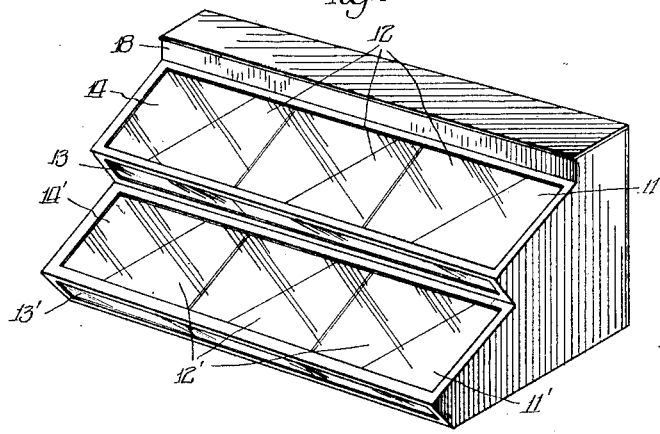
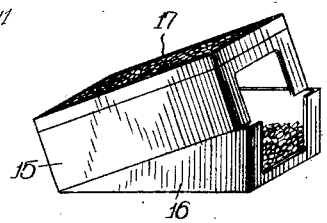
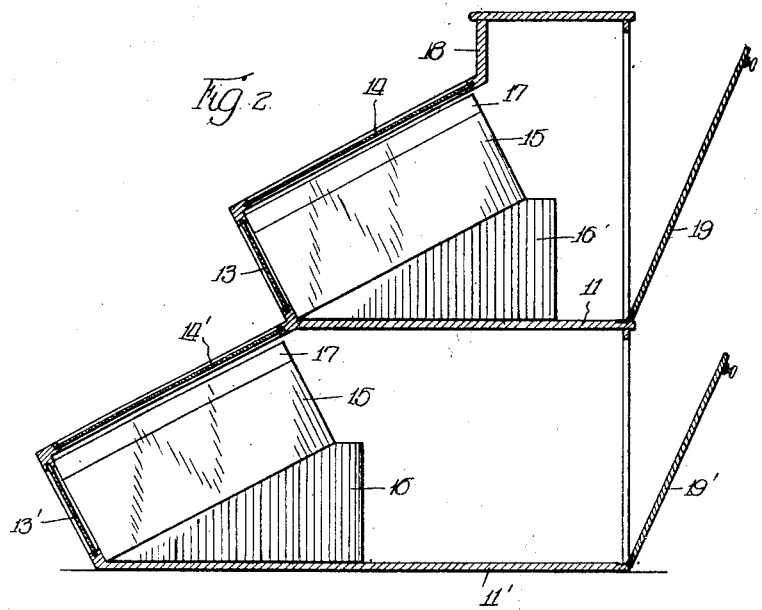
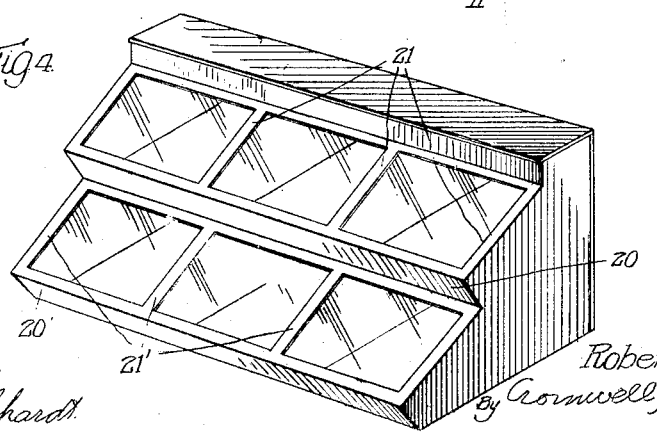
Witness:
R. Burkhardt
Inventor:
Robert C. Krueger,
by Cromwell, Greist & Barnum
Attys Patented Apr. 16, 1929.

1,709,080

UNITED STATES PATENT OFFICE.

ROBERT C. KRUEGER, OF MANHATTAN, KANSAS, ASSIGNOR TO E. J. BRACH & SONS, OF CHICAGO, ILLINOIS, A CORPORATION OF ILLINOIS.

CANDY-DISPLAY DEVICE.

Application filed April 13, 1927. Serial No. 183,308.

The present invention relates to display devices especially adapted for displaying chocolate candies in their original containers.

Fancy chocolates are usually packaged in five pound boxes by the manufacturer. The chocolates are packed in layers, starting with a layer on the bottom, which is covered with a cardboard upon which is placed another layer of chocolates and so on. The top layer is packed in a neat pasteboard display tray, the chocolates being uniformly positioned in it and separated by fancy paper dividers, which gives such top layer a very attractive appearance.

In selling the candy the average merchant will not remove the tray and use the contents thereunder, but he will remove the candy from the tray or top layer. Nor will he replace the chocolates which are removed from the tray layer for sale, because of the time and trouble involved. As a result the first sale of candy from the box will ruin the display, and the sale of the remaining candy will be delayed for want of proper display, and the chocolates will deteriorate or become stale. Since the tray display adds materially to the packing expense it is desirable that it should serve its purpose for more than one customer.

Various attempts have been made to devise means of preserving the tray layer for display while at the same time permitting sale of the remaining candy in the box. Various methods of supporting the tray in sloping position upon the top of the box have proven unsatisfactory since no adequate means were provided for protecting the candy from the dust or atmosphere, or if such protection was provided the supporting device became too clumsy or too heavy for the sides of the bottom portion of the candy box which acted as the supports.

Devices have also been suggested which required the removal of the candy from the original candy containing box into a new container, which contained a portion adapted to display the tray, but these were unsatisfactory, due to the time and trouble involved by removing the candy from the old container and placing it in the new, and the expense involved in using a double set of containers.

The object of this invention is to provide a casing which will permit the original container to be used for dispensing the candy and afford means of using the top or tray layer for display purposes, while at the same time affording protection against the dust, dirt and deteriorating influences of the atmosphere.

A preferred display device is shown upon the accompanying drawings.

In the drawings:

Figure 1 is a perspective view of an empty show case which enables the original container to be used to display and dispense the candy;

Figure 2 is a vertical section taken upon a plane parallel to the sides of the show case showing the original containing boxes in position;

Figure 3 is a perspective view of one of the original containing boxes as it is placed in the show case; and Figure 4 is a perspective view of another show case with purview of the present invention showing the candies in place.

The stepped show case shown in Figures 1 and 2 has two horizontal shelves 11 and 11'. The lowermost shelf 11' can be used as a supporting bottom for the show case. The show case in the drawings is divided into six compartments by the partitions 12 and 12', each shelf containing three. The compartments are of such shape and size that an original candy container will snugly fit therein when arranged in display and dispensing position, as shown upon Figure 3.

The steps in the show case are provided with glass panel fronts 13 and 13' and glass panel covers 14 and 14', which are not movable, and which will protect the candy in the show case from the atmosphere while permitting it to be seen.

The original containing boxes are positioned in the show case as shown in Figures 2 and 3. The rear sides of the telescoping cover 15 and bottom 16 of the candy containing boxes have perforated portions, which can be removed to permit access to the candy left in the box after the removal of the trays 17 (see Figure 3). The cover 15 of the box is supported in sloping position upon the bottom 16, and the tray 17, after being removed from the box, is placed upon the sloping cover 15.

When the parts of the candy box are in proper display position as shown in Figure 2, the front of the sloping cover 15 will rest against the front of the step of the show case, and the display tray 17 resting upon the top of the box will be similarly supported and prevented from sliding forward and spilling its contents. The tray 17 will rest a short distance below and parallel to glass panels 14 and 14' and the display will be clearly visible therethrough. Any label or designation upon the front of the cover of the box will be visible through the glass panels 13 and 13'. The vertical portion 18 above the uppermost step of the show case may be provided with holders for cards designating the price or quality of the candy.

Access to the candy for purposes of sale is provided through the latched doors 19 and 19' on the rear of the show case and the candy can readily be removed from the box through the cut out portions in the rear of the cover and bottom, as shown in Figure 3, without disturbing the display.

Figure 4 shows a variation in the show case construction. The show case is so constructed that nothing will show through the transparent cover panels except the candy. The different parts of the containing box or tray will not appear. The front portions of the stepped shelves do not have transparent panels. The front of the cover and the front of the tray will be concealed and the strips 21 and 21' will cover the partitions between the compartments in the show case, and will also conceal the sides of the display tray. By displaying the candy in this manner there appears to be a solid mass of candy within the show case and the display has a very attractive effect. The opaque fronts 20 and 20' can be provided with holders for designation or price cards.

The number of shelves and the number of compartments in each shelf can readily be varied, so long as the compartments are of proper size and shape to support the sloping cover and display tray.

What is claimed is:

1. In a candy display case comprising a plurality of spaced horizontal superposed shelves, the upper shelves being successively shorter than the bottom shelf, said shelves extending between the sides of the case, upwardly and forwardly inclined walls forming continuations of the shelf portions, and sloping cover portions joining the upper end of said outwardly sloping wall and the forward end of the next superposed shelf, the upwardly inclined wall and cover portions being provided with transparent means whereby the display case will cooperate with a candy display container having its cover in elevated sloping position and provided with a display tray resting upon the sloping cover the forward wall portions acting as a stop for the candy container.

2. In a showcase comprising vertical back and side walls, and spaced horizontal superposed shelves extending between the side walls, the shelves being successively narrower approaching the top of the case, upwardly and forwardly sloping wall portions forming continuations of the front edge of said shelves and sloping cover portions connecting the upper ends of said wall portions with the forward edge of an adjacent superposed shelf whereby a staggered compartment showcase is provided to cooperate with a candy container with its cover provided with a display tray and held in inclined position parallel with the cover portions of the showcase and with the cover sides abutting the inclined wall portions of the case.

In testimony whereof I have hereunto subscribed my name.

ROBERT C. KRUEGER.